(12) United States Patent
Benhase et al.

(10) Patent No.: US 7,178,147 B2
(45) Date of Patent: Feb. 13, 2007

(54) METHOD, SYSTEM, AND PROGRAM FOR ALLOCATING PROCESSOR RESOURCES TO A FIRST AND SECOND TYPES OF TASKS

(75) Inventors: Michael Thomas Benhase, Tucson, AZ (US); YuCheng Hsu, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 871 days.

(21) Appl. No.: 09/960,900

(22) Filed: Sep. 21, 2001

(65) Prior Publication Data

US 2003/0061264 A1 Mar. 27, 2003

(51) Int. Cl.
*G06F 9/46* (2006.01)

(52) U.S. Cl. .................. 718/104; 718/100; 718/102; 718/107

(58) Field of Classification Search ............... 718/100, 718/102, 104–105, 107
See application file for complete search history.

(56) References Cited

U.S. PATENT DOCUMENTS

| | | | |
|---|---|---|---|
| 4,047,161 A | 9/1977 | Davis | |
| 4,177,513 A | 12/1979 | Hoffman et al. | |
| 4,286,322 A | 8/1981 | Hoffman et al. | |
| 4,394,727 A | 7/1983 | Hoffman et al. | |
| 4,638,427 A | 1/1987 | Martin | |
| 5,109,512 A | 4/1992 | Bahr et al. | |
| 5,274,809 A | 12/1993 | Iwasaki et al. | |
| 5,293,620 A | 3/1994 | Barabash et al. | |
| 5,742,825 A * | 4/1998 | Mathur et al. | 719/329 |
| 6,263,359 B1 * | 7/2001 | Fong et al. | 718/103 |
| 6,643,367 B1 * | 11/2003 | White-Hauser | 379/269 |
| 6,957,433 B2 * | 10/2005 | Umberger et al. | 718/103 |

\* cited by examiner

*Primary Examiner*—Meng-Al T. An
*Assistant Examiner*—Lilian Vo
(74) *Attorney, Agent, or Firm*—David W. Victor; Konrad Raynes & Victor LLP (57) ABSTRACT

Provided is a method, system, and program for allocating processor resources to a first and second types of tasks. An allocation of processor resources to the first and second types of tasks is indicated. Data is gathered indicating a first workload level for the first type of tasks and a second workload level for the second type of tasks. A determination is made of a change to the indicated allocation of processor resources to the first and second types of tasks based on at least one of the first workload level and second workload level data. Tasks of the first type are dispatched to the processor resources allocated to the first type and tasks of the second type are dispatched to the processor resources allocated to the second type.

48 Claims, 7 Drawing Sheets

| CPU ID | CPU Mode | Application Task Duration |
|---|---|---|
| CPU1 | Dedicated I/O | NA |
| CPU2 | Dedicated I/O | NA |
| CPU3 | Shared | 16 milliseconds |
| ... | ... | ... |
| CPU6 | Shared | 13 milliseconds |

METHOD, SYSTEM, AND PROGRAM FOR ALLOCATING PROCESSOR RESOURCES TO A FIRST AND SECOND TYPES OF TASKS

BACKGROUND OF THE INVENTION

1. Field of the Invention

The present invention relates to a system, method, and program for allocating processor resources to a first and second types of tasks.

2. Description of the Related Art

High end storage controllers, such as the International Business Machines Corporation (IBM) Enterprise Storage Server** (ESS), manage Input/Output (I/O) requests from networked hosts to one or more storage devices, such as a direct access storage device (DASD), Redundant Array of Independent Disks (RAID Array), and Just a Bunch of Disks (JBOD). Storage controllers include one or more host bus adaptor (HBA) cards to communicate with one or more hosts over a network and adaptors to communicate with the storage devices.

The IBM ESS storage controllers are designed to allow a general purpose operating system to run along with a special purpose, lightweight operating system to handle the I/O requests from the host channels. This arrangement is especially advantageous because now general purpose user programs, such as web servers, databases, and other application programs, may run on the storage controller that is concurrently managing I/O requests directed to attached storage devices.

Figure 1:
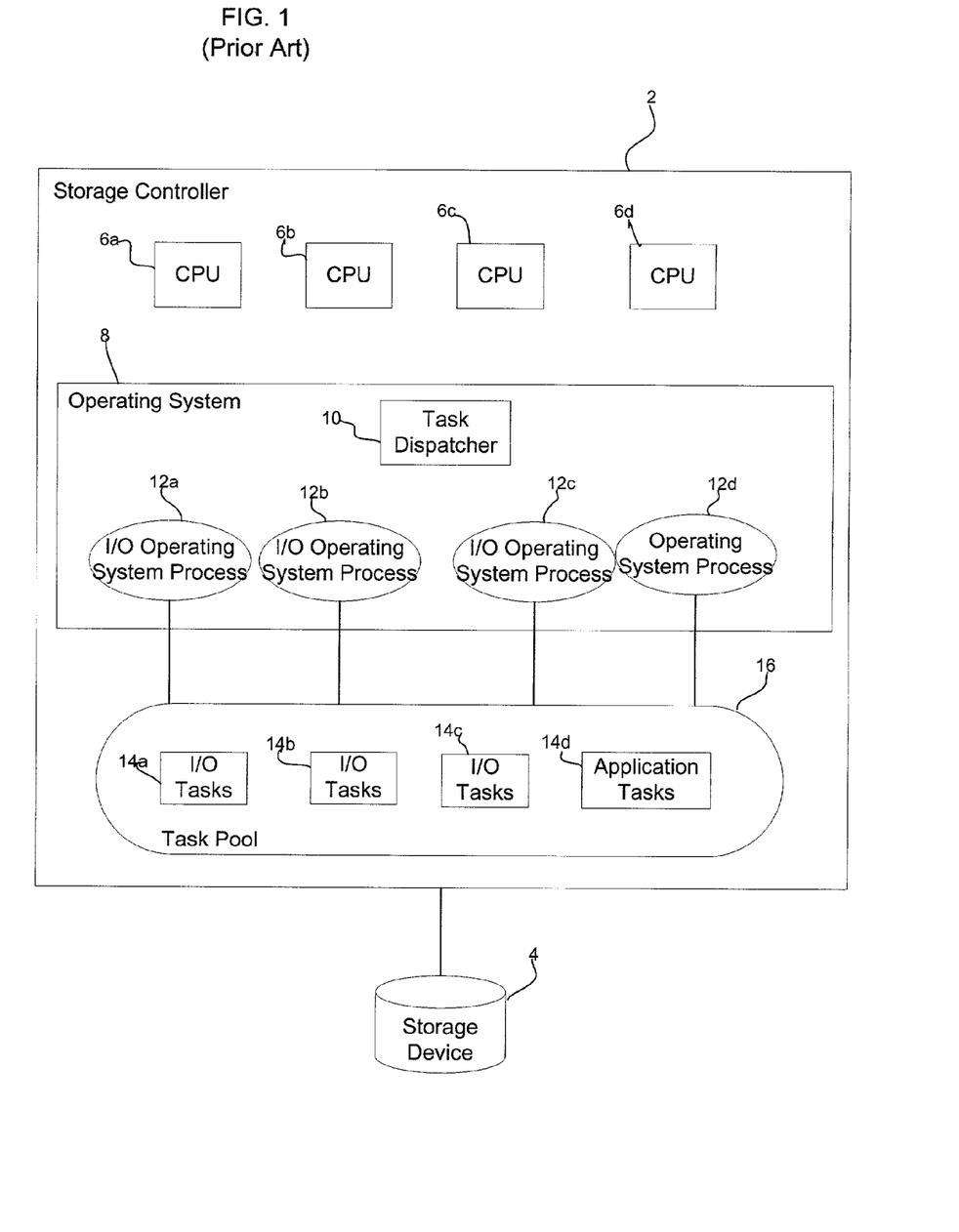
FIG. 1 illustrates a prior art storage controller architecture.

FIG. 1 illustrates an architecture of the prior art ESS storage controller 2 for managing I/Os from hosts to a storage device 4 (e.g., a DASD, JBOD, RAID array, etc.) and the execution of user applications, e.g., database programs, web servers, etc. The storage controller 2 includes four central processing units (CPUs) 6a, b, c, d and a general purpose operating system 8, such as AIX, UNIX OS/390, etc. The operating system 8 includes a task dispatcher 10 that assigns CPUs 6a, b, c, d to execute either a general purpose operating system process or a special purpose I/O operating system process. The I/O operating system process is a special purpose, lightweight operating system designed specifically to execute I/O tasks 14a, b, c in a task pool 16 that are directed to the storage device 4. In current implementations, the task dispatcher 10 will allocate three of the CPUs 6a, b, c to execute the I/O operating system to handle I/O related tasks. To ensure that the three CPUs 6a, b, c remain dedicated to I/O related tasks, the task dispatcher 10 will dispatch kernel I/O operating system processes that will execute the I/O tasks 14a, b, c. Because a general application related task will never have higher priority than a kernel process, those CPUs processing I/O tasks 14a, b, c in kernel mode cannot be reassigned to handle lower priority application tasks 14d.

In prior art implementations, the task dispatcher 10 has only one CPU 14d operating in shared mode. In shared mode, the task dispatcher 10 dispatches application tasks in the task pool 16 to the CPU 6d, running the operating system process 12d, for a period of time or until there are no more application tasks to dispatch. After the period of time, the task dispatcher 10 then alternates to dispatching I/O tasks to the shared CPU 6d, to have the shared CPU 6d execute the I/O operating system process to execute I/O tasks 14a, b, c for another period of time. If the shared CPU 6d completes execution of application tasks 14d prior to the period of time, then an alarm thread assigned the lowest possible priority would be executed to cause a context switch where the task dispatcher 10 will begin dispatching I/O requests in kernel mode to the shared CPU 6d.

With the prior art technique of task management, the IBM ESS storage controller favors I/O operations directed to the storage device 4 because such I/O operations are often critical. This leaves just one CPU 6d to execute application tasks 14d on a shared basis. This technique has the advantage of always providing some level of resources for both I/O tasks 14a, b, c and application tasks 14d in the task pool 16, although favoring the I/O tasks 14a, b, c.

There is a continued need in the art to provide improved task management techniques to optimize the allocation of CPU resources to handle I/O tasks and general application program related tasks in order to maximize overall system performance.

SUMMARY OF THE PREFERRED EMBODIMENTS

Provided is a method, system, and program for allocating processor resources to a first and second types of tasks. An allocation of processor resources to the first and second types of tasks is indicated. Data is gathered indicating a first workload level for the first type of tasks and a second workload level for the second type of tasks. A determination is made of a change to the indicated allocation of processor resources to the first and second types of tasks based on at least one of the first workload level and second workload level data. Tasks of the first type are dispatched to the processor resources allocated to the first type and tasks of the second type are dispatched to the processor resources allocated to the second type.

In further implementations, the allocation of processor resources to the first and second types of tasks further comprises allocating a first portion of processor resources to a first mode, wherein only tasks of the first type are dispatched to the first portion of processor resources. A second portion of processor resources are allocated to a second mode, wherein tasks of the first and second type are both dispatched to the second portion of processor resources allocated to the second mode.

Still further, gathering the data indicating the first workload level comprises determining a rate at which tasks of the first type are received and gathering data indicating the second workload level comprises determining a duration during which the processor resources process tasks of the second type.

In yet further implementations, determining whether to change the indicated allocation of processor resources is further based on a combination of the indicated allocation of processor resources and at least one of the first workload level and second workload level.

In certain implementations, tasks of the first type comprise Input/Output (I/O) tasks and wherein tasks of the second type comprise application tasks.

The described implementations provide a technique for allocating processor resources to handle different types of tasks, such as I/O tasks versus application tasks. The described implementations provide a workload balancing technique to alter the allocation of processor resources based on the workload levels for the first and second types of tasks.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 2:
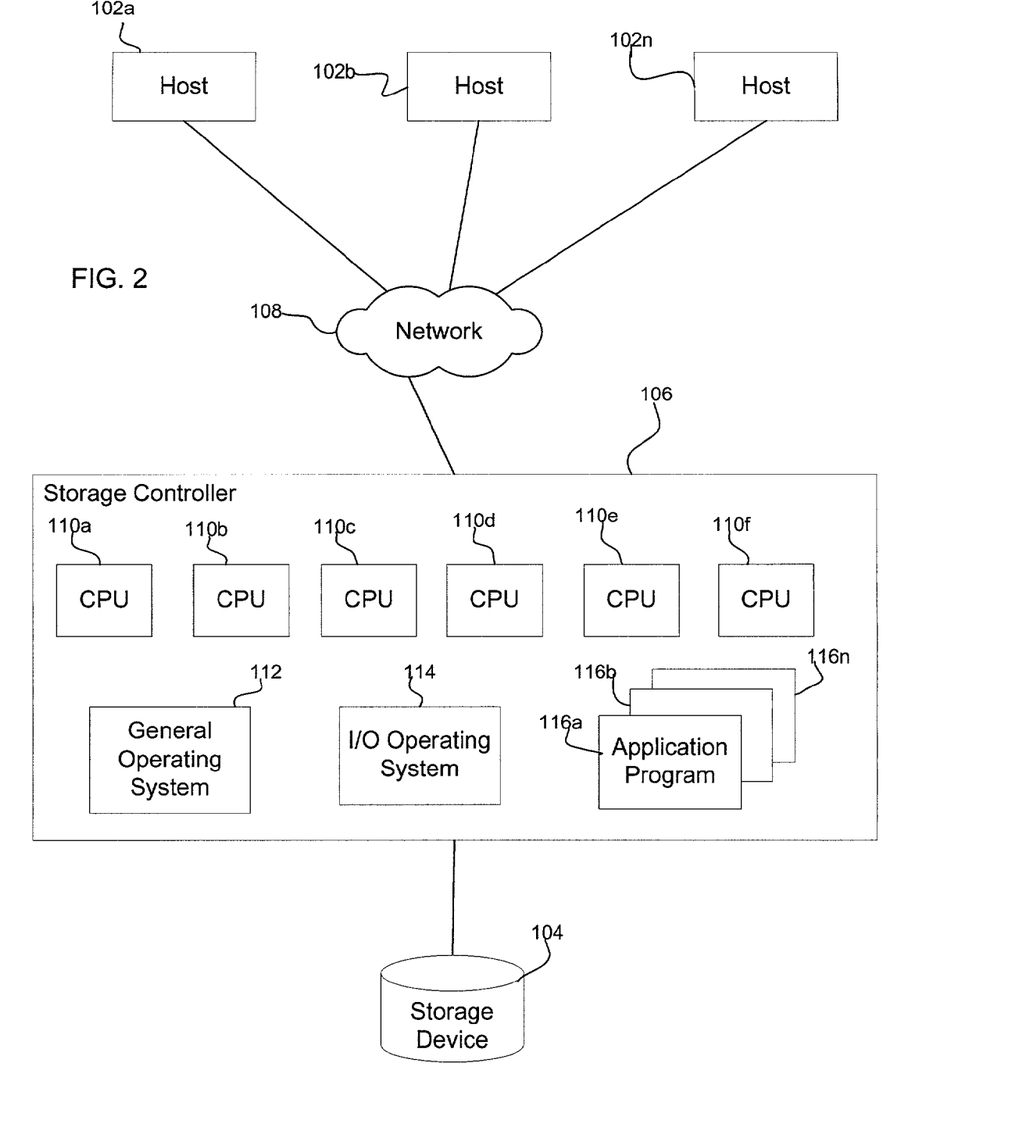
FIGS. 2 and 3 illustrates storage controller architectures in accordance with implementations of the invention.

FIG. 2 illustrates a computing environment in which aspects of the invention are implemented. A plurality of host systems 102a, b . . . n transmit Input/Output (I/O) requests to a storage device 104, or multiple storage devices, through a storage controller 106 which manages access to the storage device 104. In certain implementations, the storage device 104 is comprised of a plurality of hard disk drives organized as Just a Bunch of disks (JBOD), a RAID array, DASD, or any other type of storage system known in the art. The host systems 102a, b . . . n communicate with the storage controller 106 over a network 108, such as the Internet, a Storage Area Network (SAN), an Intranet, Local Area Network (LAN), Wide Area Network (WAN), etc., using a communication protocol such as TCP/IP, Fibre Channel, Ethernet, etc.

In certain implementations, the storage controller 106 includes a plurality of processors, referred to herein as CPUs, shown as six CPUs 110a, b, c, d, e, f. The CPUs 110a, b . . . f may comprise any processor type of device known in the art. The storage controller 106 further enables execution of two different operating systems, a general purpose operating system 112 designed to run application programs, such as AIX, UNIX WINDOWS**, etc., and an I/O operating system 114. The storage controller 106 further includes one or more application programs 116a, b . . . n, such as a web server, database program, or any other application program known in the art. In certain implementations, each I/O operating system 114 process would be run by one general operating system 112 process, i.e., a general operating system 112 thread would execute the I/O operating system 114 process handling I/O operations to the storage device 104.

Figure 3:
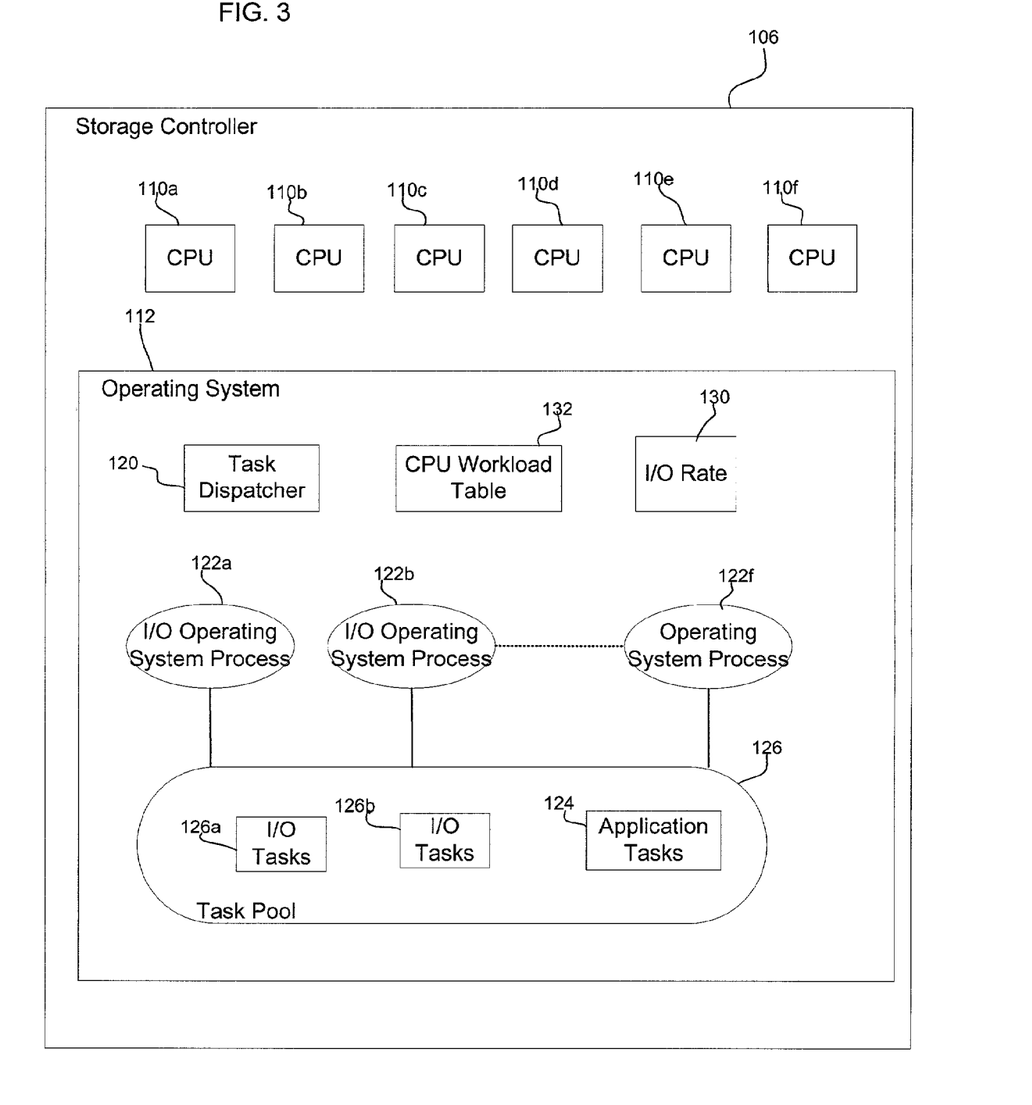

FIG. 3 illustrates further details of the architecture of the operating system 112. A task dispatcher 120 runs within the general operating system 112 to manage the assignment of tasks to concurrently execute at the CPUs 110a, b . . . f. Each CPU 110a, b . . . f would execute general operating system 112 processes 122a, b . . . f to handle application tasks 124 or run an I/O operating system 114 process to handle I/O tasks 126a, b, i.e., I/O requests directed to the storage device 104, where the tasks 124, 126a, b are managed in a task pool 126. FIG. 3 shows the I/O operating system processes 122a, b executing within the general operating system 112. In certain implementations, at least one CPU 110a, b . . . f is dedicated to run I/O operating system processes 122a, b . . . to handle I/O tasks 126a, b and at least one other CPU is assigned to execute in shared mode. The other remaining four CPUs may be allocated to shared mode or dedicated to the I/O tasks 126a, b. In shared mode, the CPU 110a, b . . . f will alternate between executing application tasks 124 for a maximum predetermined time period, e.g., 20 milliseconds, and then context switch to executing I/O operating system processes 122a, b to handle I/O tasks 126a, b for another predetermined time period, e.g., 4 milliseconds.

In certain implementations, the I/O operating system 114 keeps track of an I/O rate 130, e.g., the number of I/O requests per second, for the entire storage controller 106. Further, a CPU workload table 132 maintains information on the allocation of CPUs 110a, b . . . f to either I/O tasks, referred to as dedicated I/O mode, or shared mode where the CPU alternates between processing I/O tasks 126a, b and application tasks 124. Both the task dispatcher 120 and I/O operating system processes 122a, b utilize the CPU work to determine an allocation of CPUs to dedicated I/O or shared mode in the manner described below.

Figure 4:
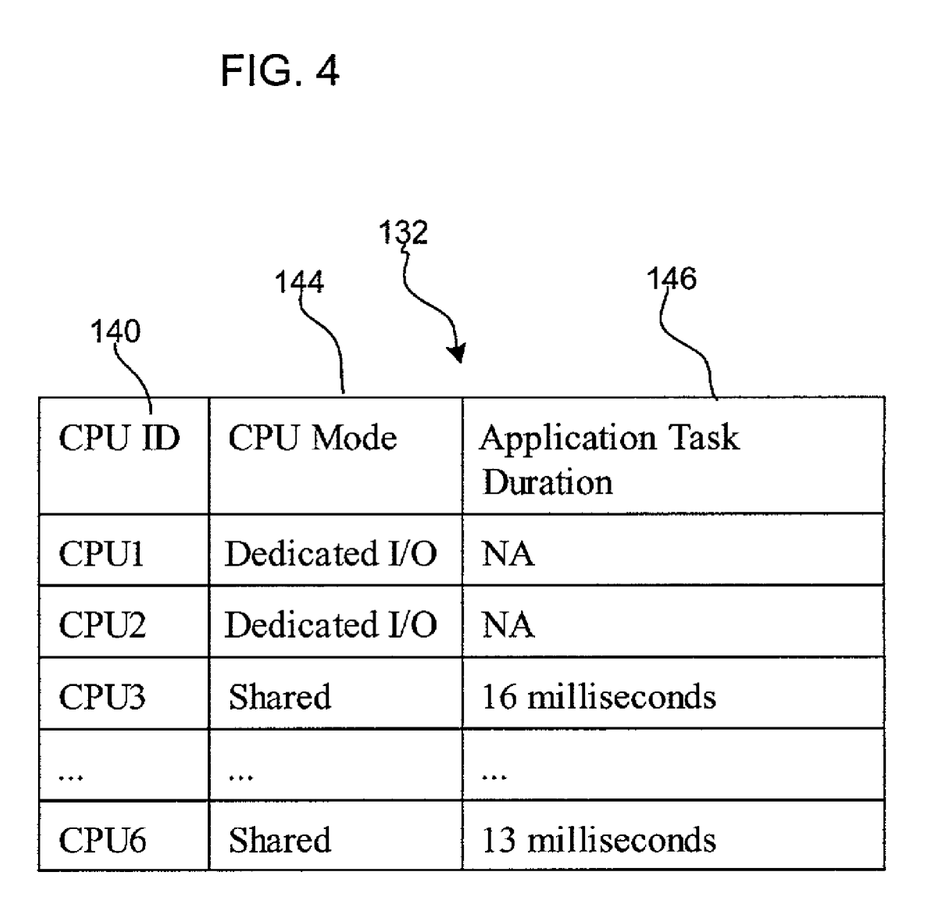
FIG. 4 illustrates a workload table indicating an allocation of processor resources in accordance with implementations of the invention.

FIG. 4 illustrates an implementation of the CPU workload table 132 including the following fields:

CPU ID 140: identifies one particular CPU 110a, b . . . f.

CPU Mode 144: indicates whether the CPU is dedicated to processing I/O requests, dedicated I/O mode, or operating in shared mode and switching between running the I/O operating system 114 to handle I/O tasks 126a, b and running the general operating system 112 to handle application tasks 124.

Application Task Duration 146: indicates the duration that the CPU 110a, . . . f processes application tasks 124 in shared mode. The duration may comprise the maximum timeout period for processing application tasks, e.g., 20 milliseconds, or an earlier time if there are no further available application tasks 124 to dispatch to the shared CPU 110a, b . . . f before the completion of the timeout period.

In the described implementations, both the task dispatcher 120 and I/O operating system processes 122a, b utilize the CPU workload table 132 and information therein to determine CPUs to dedicate to I/O tasks or manage in shared mode. The task dispatcher 120 and I/O operating system processes 122a, b utilize algorithms described below to consider the relative workload for I/O tasks and application tasks in determining the allocation of CPU resources to dedicated I/O mode or shared mode. In certain implementations where the storage controller 106 is deployed to manage I/O traffic from hosts 102a, b . . . n to the storage device 104, CPU resources are allocated in a manner that dedicates a minimum number of CPU resources to handle I/O tasks at an acceptable level of performance and, at the same time, allocates a minimum number of CPU resources as shared to make resources always available to handle the application tasks 124 generated by the application programs 116a, b . . . n.

Figure 5:
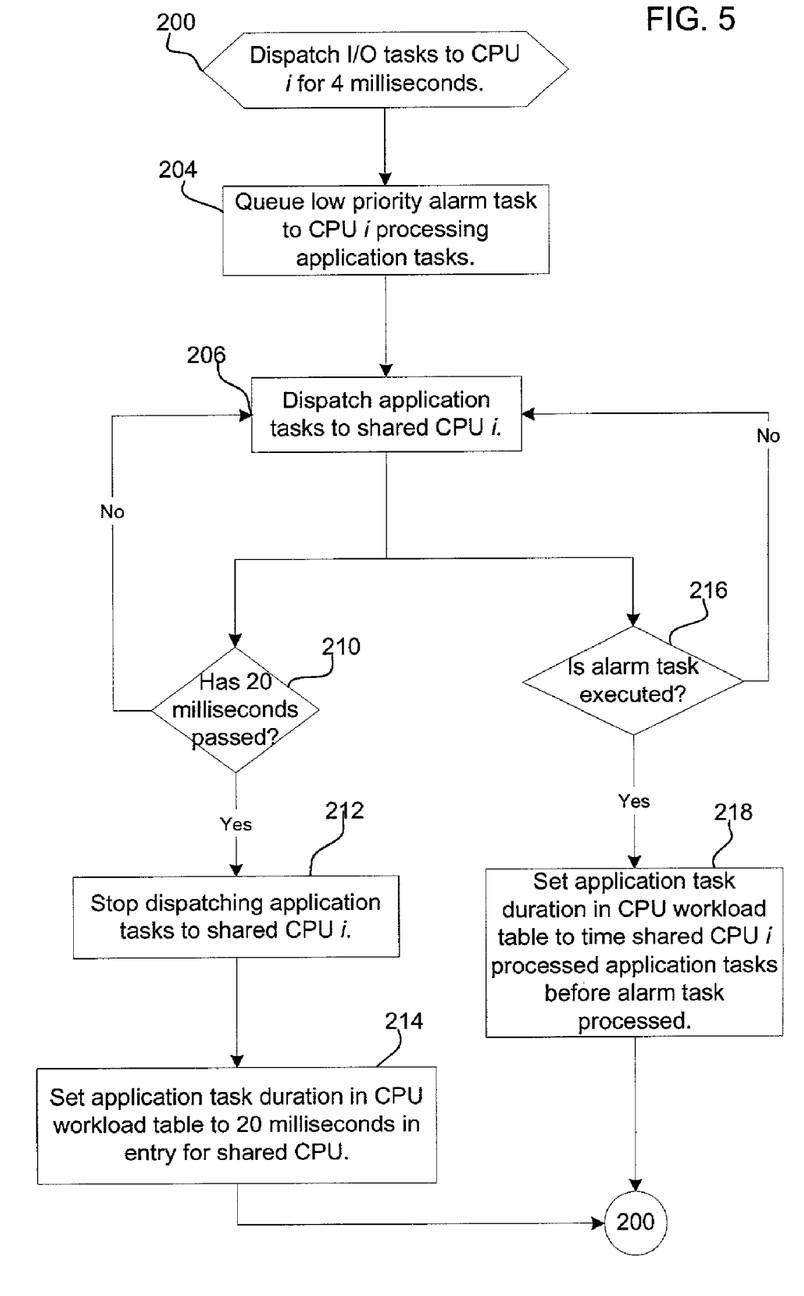
FIG. 5 illustrates logic for dispatching I/O related tasks to processors operating in shared mode in accordance with implementations of the invention.

In dedicated I/O mode, the CPU 110a, b . . . f executes an I/O operating system process 122a, b (FIG. 3) to process I/O requests to the storage device 104. FIG. 5 illustrates logic implemented by the task dispatcher 120 to dispatch tasks to CPUs 110a, b . . . f operating in the shared mode. Control begins at block 200 with the task dispatcher 120 dispatching I/O tasks to CPU i designated in the CPU workload table 132 as being in shared CPU mode 144 for four milliseconds, or some other predetermined time period. After four milliseconds, the task dispatcher 120 queues (at block 204) an alarm task at the lowest possible priority to CPU i that will be processed by CPU i if there are no available application tasks 124 to process, thereby indicating that there are no further application tasks 124 to run. The task dispatcher 120 further dispatches (at block 206) application tasks to CPU i running the general operating system process 122*f* (FIG. 3) to handle application tasks 124. If (at block 210) 20 milliseconds (ms) has elapsed while dispatching application tasks 124 to the CPU i, then the task dispatcher 120 stops (at block 212) dispatching application tasks 124 to CPU i and sets (at block 214) the duration field 146 in the CPU worktable 132 for CPU i to 20 milliseconds. If (at block 216) the alarm task is executed while the task dispatcher 120 is dispatching application tasks 124 to the CPU i, then the task dispatcher 120 stops sending application tasks 124 to the CPU i and sets (at block 218) the application task duration to the time that elapsed from when the task dispatcher 120 began sending application tasks 124 to CPU i at block 204 until the time that the low priority alarm task was executed. From the no branches of blocks 210 and 216 control returns to block 206 to continue to dispatch application tasks to the shared CPU i until one of the conditions at block 210 and 216 are satisfied. From blocks 214 or 218, control proceeds back to block 200 to dispatch I/O tasks 122*a, b* to the shared CPU i for 4 milliseconds (ms).

With the logic of FIG. 5, the task dispatcher 120 will alternate between sending I/O tasks 126*a, b* and application tasks 124 in the task pool 126 to shared CPU i for 4 and 20 milliseconds, respectively. Those skilled in the art will appreciate that tasks may be dispatched to shared CPUs 110*a, b . . . f* for time periods other than 4 and 20 milliseconds. One reason for providing substantially more time for application tasks 124 than I/O tasks 126*a, b* is that I/O tasks take substantially less time on average to complete than application tasks. For instance, an I/O task 126*a, b* can take a couple of hundred microseconds to execute whereas an application task 124 can take several milliseconds.

With the logic of FIG. 5, the task dispatcher 120 alternates dispatching application tasks and I/O tasks in shared mode. While processing application tasks, the task dispatcher 120 gathers performance data on the application task processing in the duration field 146 (FIG. 4) in the CPU workload table 132 that indicates the application task workload. For instance, if the application task workload is relatively low or significantly less than the maximum allowed processing time, e.g., 20 milliseconds, then the requests from the application programs 116*a, b . . . n* for application tasks 124 is relatively light. However, if the duration field 146 is close to or at 20 milliseconds, then the application task workload is relatively high because application tasks are available to be dispatched for the maximum allowed time, e.g., 20 milliseconds.

Figure 6:
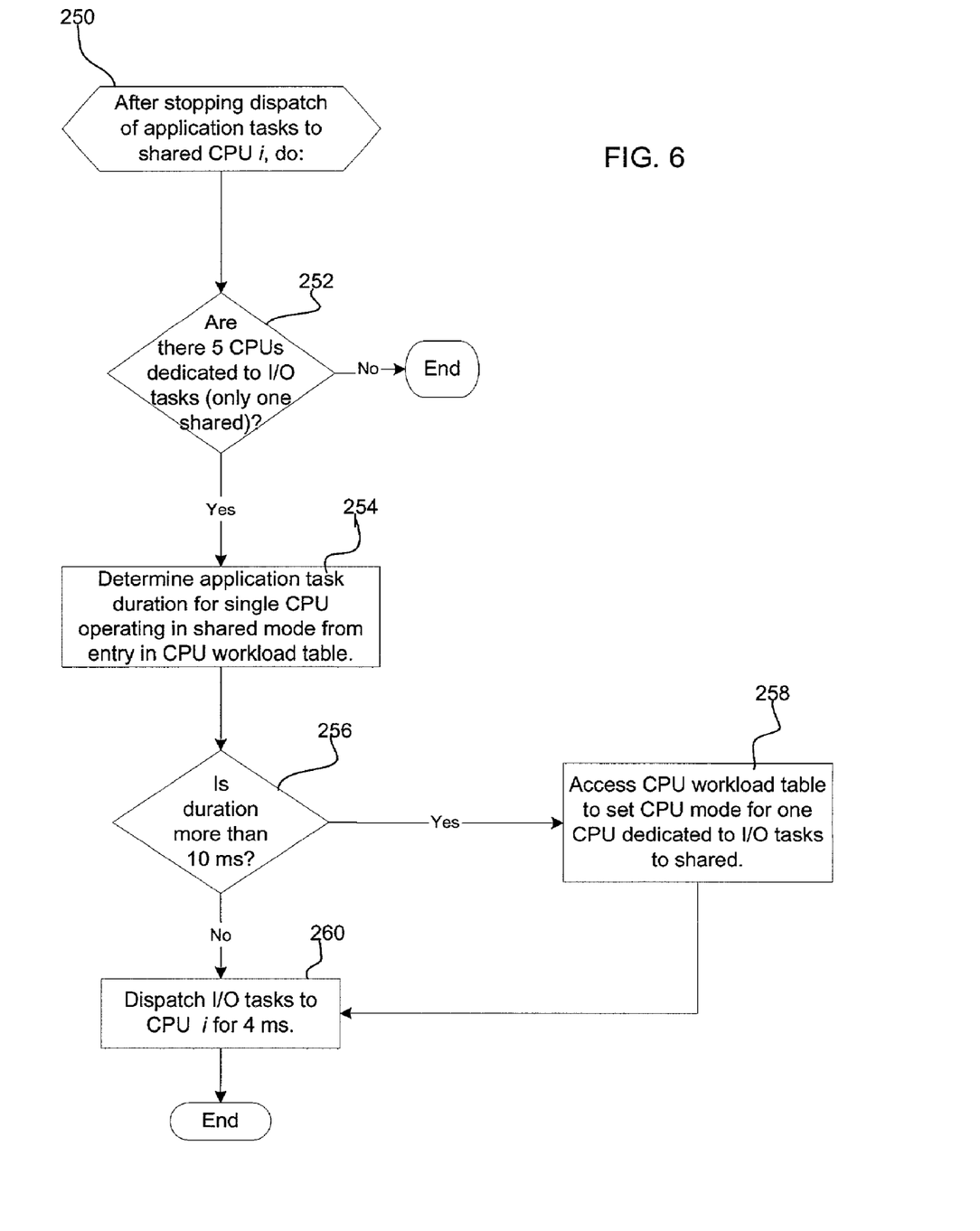
FIGS. 6 and 7 illustrate logic to alter the allocation of processor resources between I/O tasks and application tasks in accordance with implementations of the invention.

FIG. 6 illustrates logic implemented in the task dispatcher 120 to alter the allocation of CPUs 110*a, b . . . f* to either exclusively process I/O tasks in I/O dedicated mode or to operate in shared mode and alternate between I/O and application tasks based on the information in the workload table 132 and the relative I/O and application workloads. The I/O workload is indicated by the I/O rate 130 and the application workload is indicated by the average application task duration. The average application task duration may be calculated from the values in the fields 146 of the workload table 132 for CPU entries in shared CPU mode 144.

Figure 7:
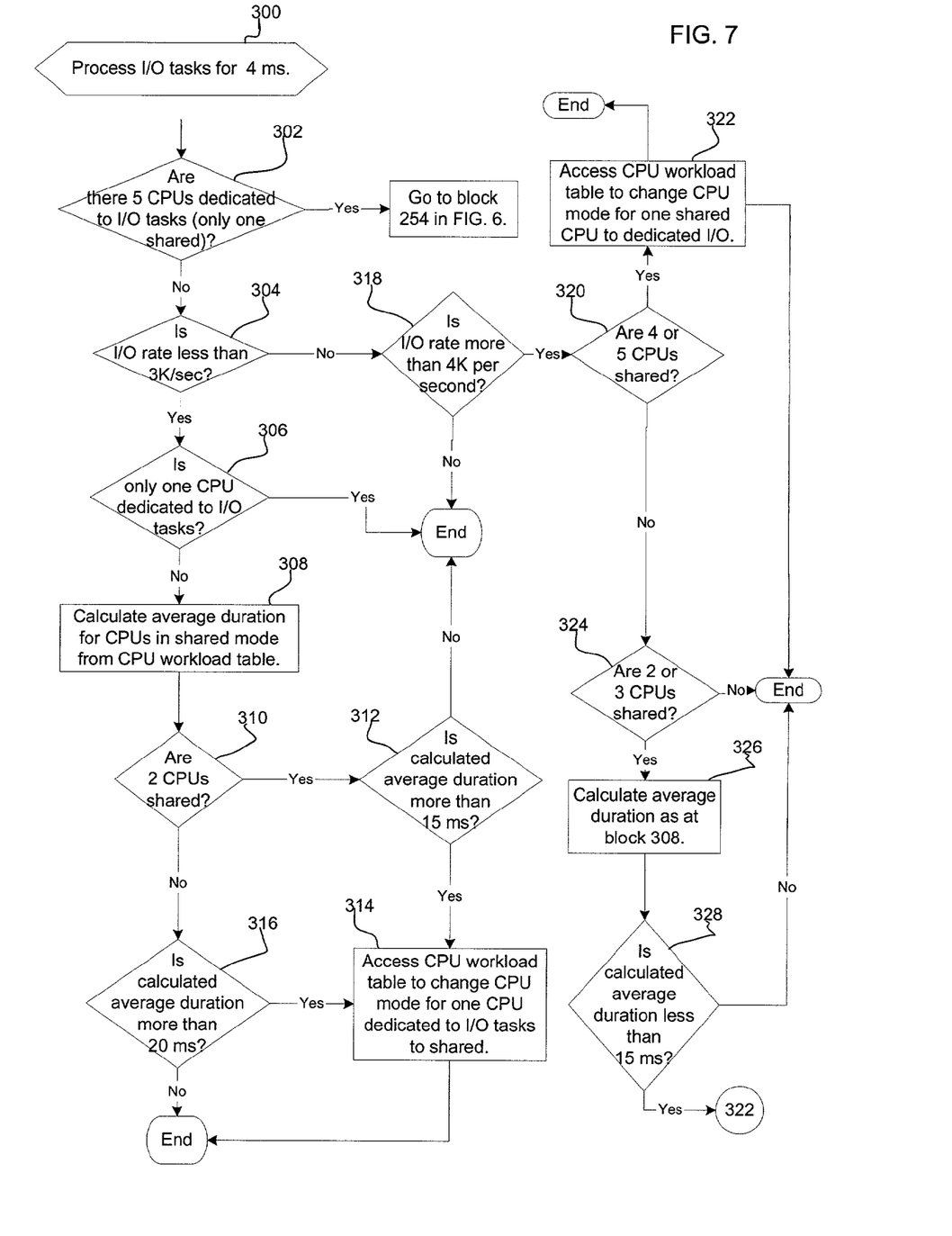

With respect to FIG. 6, control begins at block 250 after the task dispatcher 120 stops dispatching application tasks 124 to the CPU i, either after 20 milliseconds or if there are no further available application tasks to process. Application tasks may not be available to process if no new tasks are generated by the application programs 116*a, b . . . n* or if application task processing has been suspended pending the outcome of some other operation for the application task, such as an I/O operation. If (at block 252) there are five CPUs dedicated to I/O tasks, i.e., only one CPU 110*a, b . . . f* is allocated to shared mode, then the task dispatcher 120 determines (at block 254) the application task duration of the single CPU i operating in shared mode, which would be the value in the duration field 144 of the entry for CPU i. If (at block 256) the determined application task duration is more than 10 milliseconds (ms), then the task dispatcher 120 accesses (at block 258) the CPU workload table 132 to set the CPU mode 144 for one CPU dedicated to I/O tasks to shared mode. This action is taken because the application workload is moderate, yet all the other CPUs are completely allocated to I/O tasks. Thus, at this point, the workload balancing rules allocate one CPU to application tasks because of the over allocation of CPUs 110*a, b . . . f* to I/O tasks and the moderate application task workload. The task dispatcher 120 then dispatches (at block 260) I/O tasks to the shared CPU i for 4 milliseconds (ms). If (at block 256) the duration is less than 10 milliseconds (ms), then a CPU dedicated to I/O tasks is not allocated to shared mode because the application workload is relatively light. In such case, control proceeds to block 260 to begin dispatching I/O tasks 126*a, b* in shared mode FIG. 7 illustrates logic implemented in the I/O operating system process invoked by the task dispatcher 120 in shared mode to further adjust the CPU 110*a, b . . . f* allocation to dedicated I/O mode or shared mode after the shared CPU 110*a, b . . . f* has run the I/O operating system process for 4 milliseconds (ms). In this way, the I/O operating system process running in shared mode reallocates the assignment of CPUs between shared and I/O mode. If (at block 302) five of the six CPUs 110*a, b . . . f* are dedicated to I/O tasks, i.e., only one CPU 110*a, b . . . f* is operating in shared mode, then the I/O operating system process performs the steps in FIG. 6 to allocate one CPU 110 in dedicated I/O task processing mode to shared mode if the application task workload is moderately busy, e.g., if the application task duration 144 for the one CPUs 110*a, b . . . f* in shared mode is greater than 10 milliseconds. The I/O operating system process would read the CPU mode field 144 in the CPU workload table 132 to determine the number of CPUs 110*a, b . . . f* allocated to either dedicated I/O task processing or shared mode.

If (at block 302) less than five of the six CPUs 110*a, b . . . f* are dedicated to I/O tasks and if (at block 304) the I/O rate 130 is moderate, as indicated by the I/O rate 130 being less than 3000 I/Os per second, then a determination is made as to whether (at block 306) more than one CPU 110*a, b . . . f* is dedicated to I/O task processing, as indicated in the CPU mode field 144 (FIG. 4). If only one CPU is dedicated to I/O task processing, then control ends because no more CPUs 110*a, b . . . f* dedicated to I/O task processing can be allocated to shared mode. Otherwise, if (at block 306) more than one CPU 110*a, b . . . f* is dedicated to I/O task processing, then the I/O operating system process (in shared mode) calculates (at block 308) the average application task duration as the average of the values in the duration field 146 for all CPUs 110*a, b . . . f* operating in shared mode. If (at block 310) two CPUs 110*a, b . . . f* are operating in shared mode, as indicated in the CPU mode 144 field and if (at block 312) the calculated average duration is more than 15 milliseconds (ms), then the CPU workload table 132 is accessed and the CPU mode 144 for one CPU entry in dedicated I/O mode is changed to shared mode. If (from the no branch of block 310) three or four CPUs 110*a, b . . . f* are operating in shared mode and the calculated average duration is more than 20 milliseconds (ms) (at block 312), then one CPU operating in dedicated I/O mode is changed (at block 314) to shared mode.

With the logic of blocks 310 through 316, if relatively few CPUs are shared, i.e., just two, and the application workload is moderate to high, at a duration of 15 milliseconds, then one more CPU is allocated to shared mode to help with the application task processing in the task pool 126 as the I/O rate is moderate, at less than 3,000 I/Os per second, and half, or three of six, of the available CPUs 110*a, b . . . f* would still be left to handle I/O task processing. However, if (from the no branch of block 310) three or four CPUs are already operating in shared mode, then another CPU operating in I/O dedicated mode is only allocated to shared mode if the application task workload is very high, e.g., at 20 milliseconds (ms), which is the maximum possible duration. In this way, the I/O operating system process considers three relative variables in determining the allocation of CPUs to either dedicated I/O mode or shared mode, the relative I/O and application workload and the number of CPUs already allocated to shared or I/O mode.

If (at block 304) the I/O rate 130 is greater than 3000 I/Os per second, which is the moderate I/O workload threshold, then the I/O operating system process performs the steps at blocks 318 through 328 to determine whether to allocate CPUs 110*a, b . . . f* operating in shared mode to dedicated I/O mode. If (at block 318) the I/O rate 130 is not more than 4,000 I/Os per second, which is the threshold for indicating a moderately high I/O rate, then control ends. Otherwise, if the I/O rate 130 is approaching the high threshold, as indicated by an I/O rate of more than 4,000 I/Os per second, and if (at block 320) four or five CPUs are operating in shared mode, as indicated by the CPU mode field 144 in the CPU workload table 132, then the CPU mode 144 for one of the CPUs 110*a, b . . . f* operating in shared mode is changed (at block 322) to I/O dedicated mode. Otherwise, if (at block 324) only 2 or 3 CPUs are allocated to shared mode, then the average duration is calculated (at block 326). If (at block 328) the calculated average duration is less than 15 milliseconds (ms), then one of the shared CPUs 110*a, b . . . f* is allocated to the I/O dedicated mode.

With the logic of blocks 318 through 328, if the I/O workload is relatively high, i.e., greater than 4,000 I/Os per second and many CPUs are shared, e.g., 4 or 5 at block 320, then one of the shared CPUs is allocated to dedicated I/O mode regardless of the application task workload because such allocation would still leave three or four of the six CPUs operating in shared mode and available to process application tasks. If there are only two or three CPUs 110*a, b . . . f* operating in shared mode, then one of the shared CPUs will be reassigned to dedicated I/O processing if the application workload is not too high, as indicated by an average application task duration less than 15 milliseconds (ms) at block 326. The reason for the calculation at block 326 is that at such point more CPUs are allocated to I/O processing than application tasks and assigning another CPU to I/O processing will only further reduce the CPU availability for application tasks.

Thus, the described implementations provide a technique for allocating CPU resources to handle I/O or application workloads in a manner to minimize the workloads between the different types of tasks.

Additional Implementations

The described implementations may be realized as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the described implementations, the task dispatcher 120 was described as a single program component. In additional implementations, the operations described as performed by the task dispatcher 120 may be divided among multiple program components, such as an I/O task dispatcher to dispatch I/O tasks to an executing I/O operating system process and an application task processor to dispatch application tasks to CPUs handling general application program operations. Alternatively, operations described as performed by the task dispatcher 120 may be performed by other operating system components. Moreover, operations described as being performed by an I/O operating system process may be handled by another component, such as the task dispatcher 120.

The initial allocation of CPU resources to I/O or application tasks may vary. For instance, in certain implementations, the initial allocation may assign five CPUs to I/O tasks and one to application tasks under the assumption that a storage controller 106 is specifically deployed to handle I/O processing. Alternatively, if a storage controller 106 is known to have a heavy application task workload, then the initial allocation may allocate additional CPUs to shared mode to handle application tasks.

In the described implementations, there were six CPUs. Alternatively, there may be more or fewer CPUs in the system, or only one system.

In the described implementations, all resources for each processor were allocated to either I/O or application tasks. Additionally, resources within a single processor may be separately allocated to I/O or application tasks. In yet further implementations, allocating the processor resources may involve the allocation of resources within a single processor.

The logic of FIGS. 6 and 7 described specific workload balancing rules for determining at what point, based on the I/O and application workloads and current CPU allocation, to change the CPU mode for the CPU. Those skilled in the art will appreciate that there are numerous additional rules that may be used to balance workloads and current CPU allocation and to determine when to change the allocation of CPU resources to I/O and application asks.

In the described implementations, CPU resources were allocated to one of two different classes of tasks, i.e., I/O tasks or application tasks. However, the described implementations may apply to determining the allocation of CPU resources for tasks other than I/O or application tasks.

The described implementations, the CPU that handled I/O tasks executes an I/O operating system task to handle the I/O tasks. In alternative implementations, the I/O tasks may be processed by the same general purpose operating system processing the application tasks.

In the described implementations, the information related to managing the CPUs in the modes comprised a CPU workload table. In alternative implementations, the information described as included in the CPU workload table may be dispersed through different files, and only available through separate access. In other words, all the relevant information may not be maintained in a table or other file.

The preferred logic of FIGS. 5–7 describes specific operations occurring in a particular order. In alternative implementations, certain of the logic operations may be performed in a different order, modified or removed. Moreover, steps may be added to the above described logic and still conform to the described implementations. Further, operations described herein may occur sequentially or certain operations may be processed in parallel.

The described implementations concerned logic implemented in a storage controller managing access to multiple storage devices. The storage controller may comprise a specific storage controller subsystem, such as the International Business Machines, Corp. Enterprise Storage Server** or any other server or other type of device managing access to multiple storage devices. Additionally, the described implementations for allocating CPU resources to different types of tasks may be deployed in systems other than storage controllers, such as mainframes, workstations, desktop machines, or any other computing device known in the art that processes different types of tasks.

**Enterprise Storage Server; AIX and IBM are trademarks of International Business Machines Corporation; Windows is a trademark of Microsoft Corporation; and UNIX is a UNIX is a trademark of The Open Group in the United States and other countries.

The storage devices may comprise any non-volatile storage media and system known in the art, such as magnetic hard disk drives. In alternative implementations, the storage device may comprise any storage device known in the art, such as optical disks, tapes, etc.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for allocating processor resources to a first and second types of tasks, comprising:

allocating a first portion of the processor resources to a first mode;

allocating a second portion of processor resources to a second mode;

gathering data indicating a first workload level for the first type of tasks and a second workload level for the second type of tasks;

determining a change to the indicated allocation of processor resources to the first and second modes based on at least one of the first workload level and second workload level data; and dispatching only tasks of the first type to the first portion of the processor resources; and dispatching tasks of the first type and the second type to the second portion of the processor resources.

2. The method of claim 1, wherein there are multiple processors, and wherein allocating processor resources comprises allocating each of the multiple processor resources to the first and second modes.

3. The method of claim 2, wherein processor resources are allocated on a processor-by-processor basis to the first and second modes.

4. The method of claim 1, wherein gathering the data indicating the second workload level further comprises:

determining a duration during which tasks of the second type are dispatched to the second portion of processor resources allocated to the second mode.

5. The method of claim 1, wherein dispatching tasks of the first and second types to the second portion of processor resources allocated to the second mode further comprises:

dispatching tasks of the first type for a first period of time to the second portion of processor resources allocated to the second mode; and dispatching tasks of the second type for a second period of time to the second portion of processor resources allocated to the second mode.

6. The method of claim 5, wherein the second period of time comprises one of a maximum time period for dispatching tasks of the second type or a third time period during which tasks of the second type are available for dispatching, wherein the third time period is less than the maximum time period.

7. The method of claim 6, wherein gathering the data indicating the second workload level further comprises:

determining a duration during which tasks of the second type are dispatched to the processor resources allocated to the second mode, wherein the duration comprises one of the maximum time period or the third time period.

8. The method of claim 7, wherein dispatching the tasks of the second type to the second portion of processor resources comprises concurrently dispatching the tasks of the second type to the second portion of processor resources, wherein the determined duration comprises an average of the durations during which tasks of the second type are concurrently processed by the second portion of processor resources allocated to the second mode.

9. The method of claim 1, wherein tasks of the first type comprise Input/Output (I/O) tasks and wherein tasks of the second type comprise application tasks.

10. The method of claim 1, wherein gathering the data indicating the first workload level comprises determining a rate at which tasks of the first type are received and gathering data indicating the second workload level comprises determining a duration during which the processor resources process tasks of the second type, wherein different data is gathered for the first and second workload levels.

11. The method of claim 1, wherein determining whether to change the allocation of processor resources is further based on a combination of the allocation of processor resources and at least one of the first workload level and second workload level.

12. The method of claim 11, wherein the determination to change the allocation of processor resources from the first mode to the second mode occurs if the second workload level is relatively higher than the first workload level.

13. The method of claim 12, wherein the relative difference in the first and second workload levels required to change the allocation of processor resources from the first mode to the second mode is based on the processor resource allocation between the first and second modes.

14. The method of claim 13, wherein the relative difference in the first and second workload levels required to change the allocation of processor resources from the first mode to the second mode is less if more processor resources are allocated to the first mode than if more processor resources are allocated to the second mode.

15. The method of claim 11, wherein the determination to change the allocation of processor resources from the second mode to the first mode occurs if the first workload level is relatively higher than the second workload level.

16. A method for allocating processor resources to Input/Output (I/O) tasks and application tasks, comprising:
    indicating an allocation of processor resources to the I/O and application tasks, wherein the processor resources allocated to the I/O tasks execute a general purpose operating system process to run an I/O operating system process specially designed to optimize performance of executing I/O tasks and wherein the processor resources allocated to the application tasks execute the general purpose operating system process to execute the application tasks;
    gathering data indicating an I/O workload level for the I/O tasks and an application workload level for the application tasks;
    determining a change to the indicated allocation of processor resources to the I/O and application tasks based on at least one of the I/O workload level and the application workload level data; and
    dispatching I/O tasks to the processor resources allocated to the I/O tasks and application tasks to the processor resources allocated to the application tasks.

17. A system for allocating processor resources, comprising:
    a plurality of processors capable of executing a first and second types of tasks, wherein the processors provide processor resources to use for executing the first and second types of tasks;
    a task dispatcher executed by at least one of the processors to perform operations, the operations comprising:
        allocating a first portion of the processor resources to a first mode;
        allocating a second portion of processor resources to a second mode;
        gathering data indicating a first workload level for the first type of tasks and a second workload level for the second type of tasks;
        determining a change to the indicated allocation of processor resources to the first and second modes based on at least one of the first workload level and second workload level data; and
        dispatching only tasks of the first type to the first portion of the processor resources; and
        dispatching tasks of the first type and the second type to the second portion of the processor resources.

18. The system of claim 17, wherein allocating processor resources allocates each of the multiple processor resources to the first and second modes.

19. The system of claim 18, wherein processor resources are allocated on a processor-by-processor basis to the first and second modes.

20. The system of claim 17, wherein the gathering the data indicating the second workload level further comprises determining a duration during which tasks of the second type are dispatched to the second portion of processor resources allocated to the second mode.

21. The system of claim 17, wherein the dispatching tasks of the first and second types to the second portion of processor resources allocated to the second mode further comprises:
    dispatching tasks of the first type for a first period of time to the second portion of processor resources allocated to the second mode; and
    dispatching tasks of the second type for a second period of time to the second portion of processor resources allocated to the second mode.

22. The system of claim 21, wherein the second period of time comprises one of a maximum time period for dispatching tasks of the second type or a third time period during which tasks of the second type are available for dispatching, wherein the third time period is less than the maximum time period.

23. The system of claim 22, wherein the gathering the data indicating the second workload level further determines a duration during which tasks of the second type are dispatched to the processor resources allocated to the second mode, wherein the duration comprises one of the maximum time period or the third time period.

24. The system of claim 23, wherein the dispatching the tasks of the second type to the second portion of processor resources concurrently dispatches the tasks of the second type to the second portion of processor resources, wherein the determined duration comprises an average of the durations during which tasks of the second type are concurrently processed by the second portion of processor resources allocated to the second mode.

25. The system of claim 17, wherein tasks of the first type comprise Input/Output (I/O) tasks and wherein tasks of the second type comprise application tasks.

26. The system of claim 17, wherein the gathering the data indicating the first workload level determines a rate at which tasks of the first type are received and gathering data indicating the second workload level comprises determining a duration during which the processor resources process tasks of the second type, wherein different data is gathered for the first and second workload levels.

27. The system of claim 17, wherein the determining whether to change the allocation of processor resources considers a combination of the allocation of processor resources and at least one of the first workload level and second workload level.

28. The system of claim 27, wherein the determining whether to change the allocation of processor resources from the first mode to the second mode changes the allocation if the second workload level is relatively higher than the first workload level.

29. The system of claim 28, wherein the relative difference in the first and second workload levels required to change the allocation of processor resources from the first mode to the second mode is based on the processor resource allocation between the first and second mode.

30. The system of claim 29, wherein the relative difference in the first and second workload levels required to change the allocation of processor resources from the first mode to the second mode is less if more processor resources are allocated to the first mode than if more processor resources are allocated to the second mode.

31. The system of claim 27, wherein the determining whether to change the allocation of processor resources from the second mode to the first mode changes the allocation if the first workload level is relatively higher than the second workload level.

32. A system for allocating processor resources to Input/Output (I/O) tasks and application tasks, comprising:
a plurality of processors capable of executing I/O and application tasks, wherein the processors provide processor resources to use for executing the I/O and application tasks;
a task dispatcher executed by at least one of the processors to perform operations, the operations comprising:
indicating an allocation of processor resources to the I/O and application tasks, wherein the processor resources allocated to the I/O tasks execute a general purpose operating system process to run an I/O operating system process specially designed to optimize performance of executing I/O tasks and wherein the processor resources allocated to the application tasks execute the general purpose operating system process to execute the application tasks;
gathering data indicating an I/O workload level for the I/O tasks and an application workload level for the application tasks;
determining a change to the indicated allocation of processor resources to the I/O and application tasks based on at least one of the I/O workload level and the application workload level data; and
dispatching I/O tasks to the processor resources allocated to the I/O tasks and application tasks to the processor resources allocated to the application tasks.

33. An article of manufacture including code for allocating processor resources to a first and second types of tasks by:
allocating a first portion of the processor resources to a first mode;
allocating a second portion of processor resources to a second mode;
gathering data indicating a first workload level for the first type of tasks and a second workload level for the second type of tasks;
determining a change to the allocation of processor resources to the first and second types of tasks based on at least one of the first workload level and second workload level data; and
dispatching only tasks of the first type to the first portion of the processor resources; and
dispatching tasks of the first type and the second type to the second portion of the processor resources.

34. The article of manufacture of claim 33, wherein there are multiple processors, and wherein allocating processor resources comprises allocating each of the multiple processor resources to the first and second modes.

35. The article of manufacture of claim 34, wherein processor resources are allocated on a processor-by-processor basis to the first and second modes.

36. The article of manufacture of claim 33, wherein gathering the data indicating the second workload level further comprises:

determining a duration during which tasks of the second type are dispatched to the second portion of processor resources allocated to the second mode.

37. The article of manufacture of claim 33, wherein dispatching tasks of the first and second types to the second portion of processor resources allocated to the second mode further comprises:
dispatching tasks of the first type for a first period of time to the second portion of processor resources allocated to the second mode; and
dispatching tasks of the second type for a second period of time to the second portion of processor resources allocated to the second mode.

38. The article of manufacture of claim 37, wherein the second period of time comprises one of a maximum time period for dispatching tasks of the second type or a third time period during which tasks of the second type are available for dispatching, wherein the third time period is less than the maximum time period.

39. The article of manufacture of claim 38, wherein gathering the data indicating the second workload level further comprises:
determining a duration during which tasks of the second type are dispatched to the processor resources allocated to the second mode, wherein the duration comprises one of the maximum time period or the third time period.

40. The article of manufacture of claim 39, wherein dispatching the tasks of the second type to the second portion of processor resources comprises concurrently dispatching the tasks of the second type to the second portion of processor resources, wherein the determined duration comprises an average of the durations during which tasks of the second type are concurrently processed by the second portion of processor resources allocated to the second mode.

41. The article of manufacture of claim 33, wherein tasks of the first type comprise Input/Output (I/O) tasks and wherein tasks of the second type comprise application tasks.

42. The article of manufacture of claim 33, wherein gathering the data indicating the first workload level comprises determining a rate at which tasks of the first type are received and gathering data indicating the second workload level comprises determining a duration during which the processor resources process tasks of the second type, wherein different data is gathered for the first and second workload levels.

43. The article of manufacture of claim 33, wherein determining whether to change the allocation of processor resources is further based on a combination of the allocation of processor resources and at least one of the first workload level and second workload level.

44. The article of manufacture of claim 43, wherein the determination to change the allocation of processor resources from the first mode to the second mode occurs if the second workload level is relatively higher than the first workload level.

45. The article of manufacture of claim 44, wherein the relative difference in the first and second workload levels required to change the allocation of processor resources from the first mode to the second mode is based on the processor resource allocation between the first and second types of tasks.

46. The article of manufacture of claim 45, wherein the relative difference in the first and second workload levels required to change the allocation of processor resources from the first mode to the second mode is less if more processor resources are allocated to the first mode than if more processor resources are allocated to the second mode.

47. The article of manufacture of claim 43, wherein the determination to change the allocation of processor resources from the second mode to the first mode occurs if the first workload level is relatively higher than the second workload level.

48. An article of manufacture including code for allocating processor resources to Input/Output (I/O) tasks and application tasks by, indicating an allocation of processor resources to the I/O and application tasks, wherein the processor resources allocated to the I/O tasks execute a general purpose operating system process to run an I/O operating system process specially designed to optimize performance of executing I/O tasks and wherein the processor resources allocated to the application tasks execute the general purpose operating system process to execute the application tasks;

gathering data indicating an I/O workload level for the I/O tasks and an application workload level for the application tasks;

determining a change to the indicated allocation of processor resources to the I/O and application tasks based on at least one of the I/O workload level and the application workload level data; and dispatching I/O tasks to the processor resources allocated to the I/O tasks and application tasks to the processor resources allocated to the application tasks.

* * * * *